United States Patent
Reckner et al.

(10) Patent No.: US 10,309,432 B2
(45) Date of Patent: Jun. 4, 2019

(54) FLOW CONDITIONER

(71) Applicant: FMC Technologies, Inc., Houston, TX (US)

(72) Inventors: Mitchell P. Reckner, Erie, PA (US); Philip A. Martone, Erie, PA (US)

(73) Assignee: FMC Technologies, Inc., Houston, TX (US)

( * ) Notice: Subject to any disclaimer, the term of this patent is extended or adjusted under 35 U.S.C. 154(b) by 53 days.

(21) Appl. No.: 15/189,622

(22) Filed: Jun. 22, 2016

(65) Prior Publication Data

US 2017/0370385 A1    Dec. 28, 2017

(51) Int. Cl.
| | |
|---|---|
| F15D 1/02 | (2006.01) |
| F16L 55/027 | (2006.01) |
| F15D 1/00 | (2006.01) |
| G01F 25/00 | (2006.01) |
| G01F 15/00 | (2006.01) |

(52) U.S. Cl.
CPC ............ *F15D 1/025* (2013.01); *F15D 1/001* (2013.01); *F16L 55/02754* (2013.01); *G01F 15/00* (2013.01); *G01F 25/0007* (2013.01)

(58) Field of Classification Search
CPC ............................ F15D 1/025; F16L 55/02754
USPC ................... 138/42, 44, 39, 40, 37, 115, 111
See application file for complete search history.

(56) References Cited

U.S. PATENT DOCUMENTS

| | | | | |
|---|---|---|---|---|
| 3,791,414 A | * | 2/1974 | Anand ...................... | F15D 1/02 138/37 |
| 4,003,253 A | * | 1/1977 | Yard ...................... | G01F 1/3209 73/861.22 |
| 4,179,222 A | * | 12/1979 | Strom ...................... | F28F 13/12 138/38 |
| 4,408,892 A | * | 10/1983 | Combes ................ | B01F 5/0689 138/42 |
| 4,420,016 A | * | 12/1983 | Nichols ................... | F16L 3/003 138/103 |

(Continued)

FOREIGN PATENT DOCUMENTS

| | | |
|---|---|---|
| DE | 102006047526 A1 | 4/2008 |
| DE | 102007060046 A1 | 6/2009 |

(Continued)

OTHER PUBLICATIONS

International Search Report and Written Opinion issued issued in International Application No. PCT/US2017/038695; dated Sep. 21, 2017 (15 pages).

*Primary Examiner* — Craig M Schneider
*Assistant Examiner* — David R Deal
(74) *Attorney, Agent, or Firm* — Osha Liang LLP

(57) ABSTRACT

A flow conditioner for use in a conduit includes a ring having a plurality of stepped elements disposed on an inner surface of the ring. A method for conditioning fluid using a flow conditioner includes coupling a flow conditioner to an interior surface of a conduit, flowing fluid through the conduit, contacting a surface of the flow conditioner with the flowing fluid, positioning a flow meter downstream of the flow conditioner, and measuring the flow profile of the fluid with the flow meter. Contacting the flow conditioner reduces one or more disturbances in a flow profile of the fluid. A flow conditioner includes a ring having at least one of a stepped element formed on an inner surface of the ring or a fin assembly coupled to the ring.

20 Claims, 7 Drawing Sheets

(56) References Cited

U.S. PATENT DOCUMENTS

| | | | | |
|---|---|---|---|---|
| 5,146,910 | A * | 9/1992 | Grahl | F23M 9/06 |
| | | | | 126/110 R |
| 9,328,869 | B2 * | 5/2016 | Ekholm | F17C 13/04 |
| 2001/0029988 | A1 * | 10/2001 | Robison | F15D 1/02 |
| | | | | 138/44 |
| 2008/0037366 | A1 * | 2/2008 | Smith | F15D 1/001 |
| | | | | 366/337 |
| 2008/0092888 | A1 * | 4/2008 | Haroutunian | A61M 15/0086 |
| | | | | 128/203.29 |
| 2010/0224275 | A1 * | 9/2010 | Pinkerton | F15D 1/02 |
| | | | | 138/39 |
| 2011/0048065 | A1 * | 3/2011 | Petersen | B01D 19/0042 |
| | | | | 62/509 |
| 2013/0306183 | A1 * | 11/2013 | Sawchuk | F15D 1/02 |
| | | | | 138/44 |
| 2014/0338771 | A1 * | 11/2014 | Brown | F15D 1/025 |
| | | | | 138/40 |
| 2014/0373955 | A1 * | 12/2014 | Fraser | F15D 1/04 |
| | | | | 138/44 |

FOREIGN PATENT DOCUMENTS

| | | |
|---|---|---|
| EP | 1775560 A2 | 4/2007 |
| WO | 2016/080976 A1 | 5/2016 |

\* cited by examiner

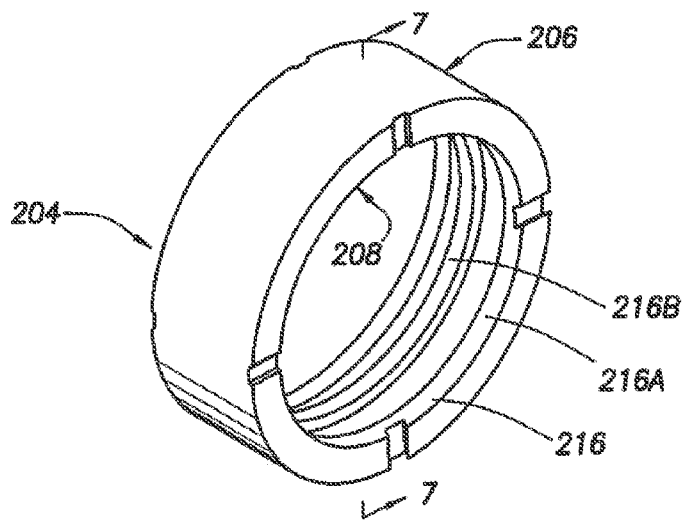
Fig.6
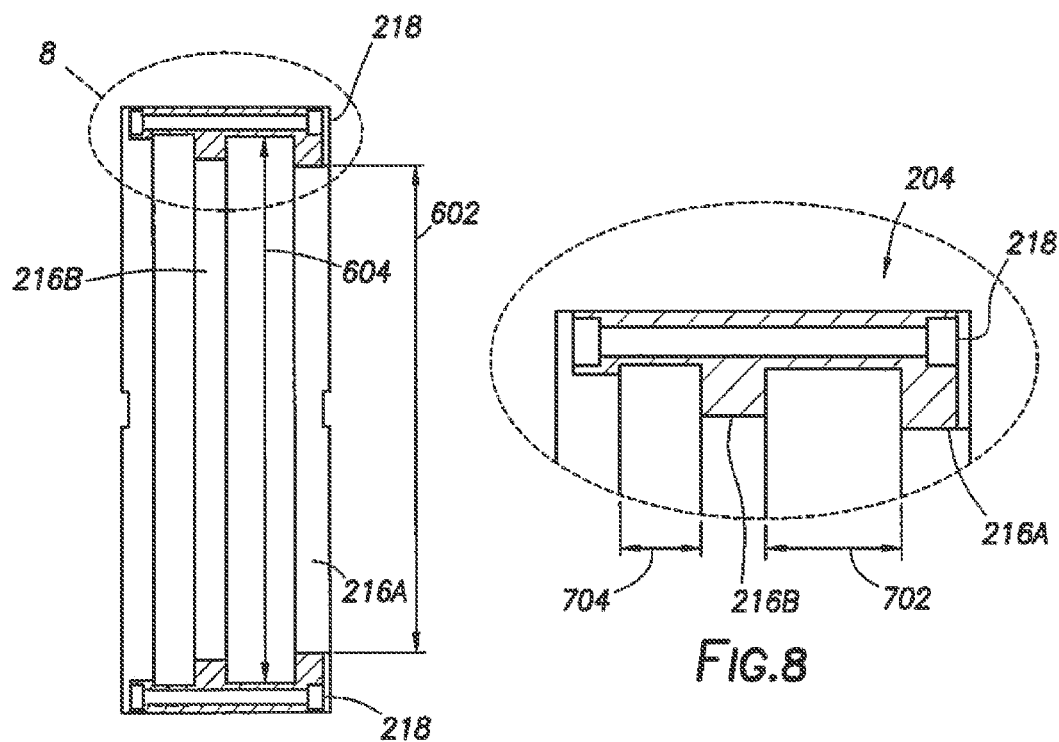
Fig.7
Fig.8

FLOW CONDITIONER

FIELD OF THE DISCLOSURE

Embodiments disclosed herein relate to a method and apparatus capable of adjusting flow characteristics of a fluid suitable for use with various fluid flow profile measuring devices. More particularly, embodiments disclosed herein are directed to flow conditioners that may be used with a number of equipment, including flow meters.

BACKGROUND

Piping systems, including pipelines, are often used by many industries in conveying and transferring various fluids from place to place. The oil and gas industry is one such industry that uses pipelines for transporting hydrocarbons (oil and natural gas) in particular over a range of distances. Piping systems may be used for transporting a broad range of fluids at various temperature and pressure conditions. Fluids may be in the form of liquids, gases, or a mixture of both liquids and gases.

Flow meters are devices used to measure the flow profile of fluids flowing through a pipeline. The given flow characteristics of a fluid may generally be described as the flow conditions of a corresponding fluid. Flow conditioners are mechanical devices used to adjust or alter disturbances in the flow profile of a fluid.

Disturbances in the flow profile of a fluid, including irregularities in a fluid profile, may be caused by any number of factors, and can affect the flow profile of fluids flowing through a piping system. Further, disturbances may have adverse effects on the ability of a flow meter to take accurate measurements. Flow conditioners may be useful in adjusting disturbed or highly disturbed flow profiles.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a flow conditioner for use in a conduit, the flow conditioner including a ring having a plurality of stepped elements disposed on an inner surface of the ring.

In another aspect, embodiments disclosed herein relate to a method for conditioning fluid using a flow conditioner, the method including coupling a flow conditioner to an interior surface of a conduit, flowing fluid through the conduit, contacting a surface of the flow conditioner with the flowing fluid, wherein the flow conditioner comprises a ring having an outer surface, an inner surface, and at least one stepped element disposed on the inner surface of the ring, the contacting the flow conditioner reducing one or more disturbances existing in a flow profile of the fluid, positioning a flow meter downstream of the flow conditioner, and measuring the flow profile of the fluid with the flow meter.

In another aspect, embodiments disclosed herein relate to a system for using a flow conditioner in a conduit including a conduit, a flow meter coupled to the conduit, and a flow conditioner disposed in the conduit upstream of a location of the flow meter, the flow conditioner including a ring having an outer surface, an inner surface, and at least one of a stepped element formed on the inner surface of the ring or a fin assembly coupled to the ring.

Other aspects and advantages of the claimed subject matter will be apparent from the following description and the appended claims.

BRIEF DESCRIPTION OF DRAWINGS

FIG. 6 shows a perspective view of a ring according to embodiments of the present disclosure.

FIG. 7 and FIG. 8 show different cross sectional views of a ring according to embodiments of the present disclosure.

DETAILED DESCRIPTION

Figure 1:
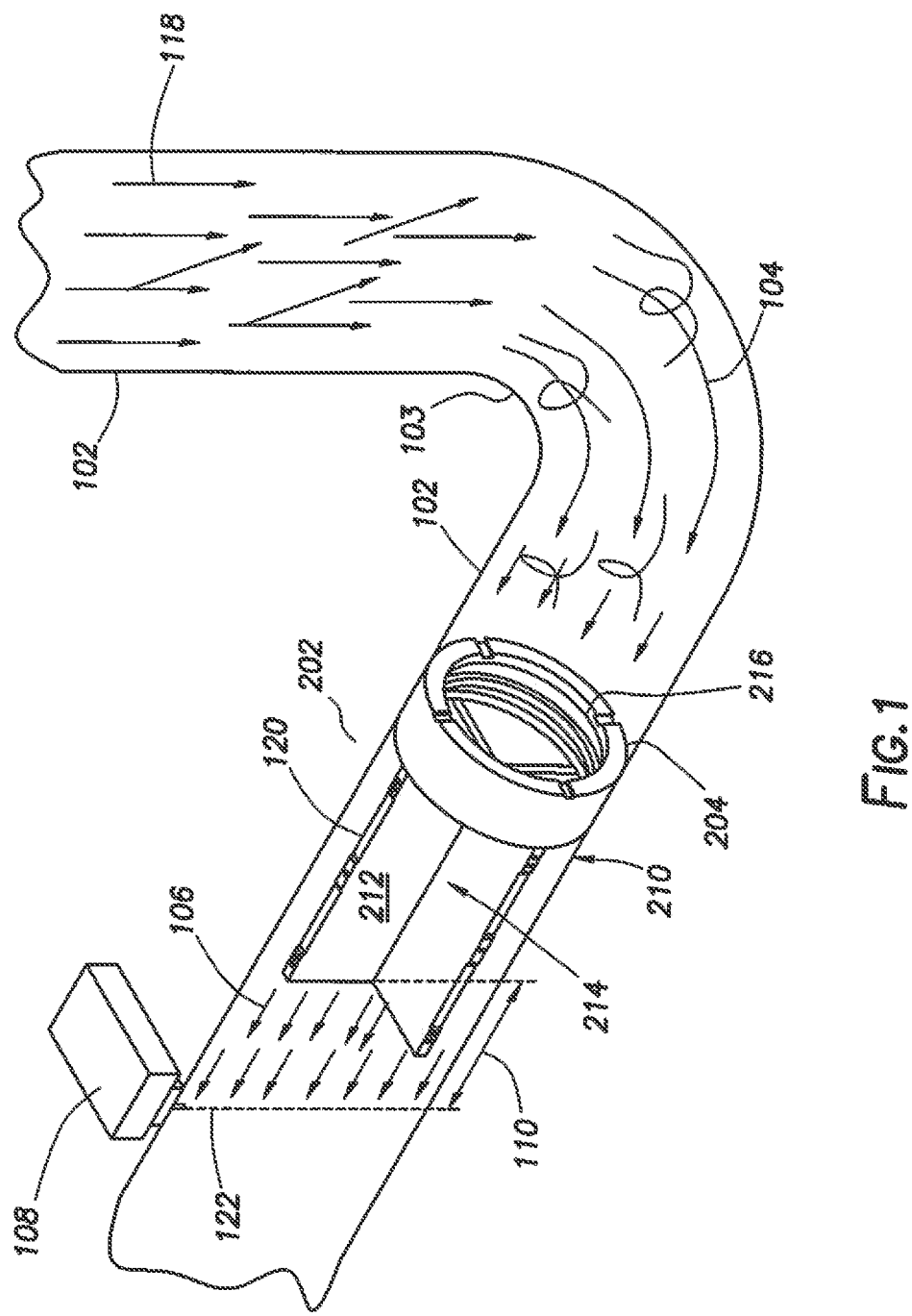
FIG. 1 shows a diagram of a flow conditioner configured to operate within a pipe according to embodiments of the present disclosure.

Embodiments of the present disclosure will be described below with reference to the figures. In one aspect, embodiments disclosed herein relate to a flow conditioner configured to condition disturbances in a flow profile of a fluid stream as it flows through a conduit.

The term "set" as used herein may refer to one (individual) or may refer to a plurality of any following term associated with the word "set". In the following discussion and in the claims, the terms "including" and "comprising" are used in an open-ended fashion, and thus should be interpreted to mean "including, but not limited to . . . ." Wherever possible, like or identical reference numerals are used in the Figures to identify common or the same elements. The Figures are not necessarily to scale and certain features and certain views of the Figures may be shown exaggerated in scale for purposes of clarification.

Additionally, the term "couples" or "coupled" as used herein may be used to indicate either a direct or an indirect connection. Thus, if a first component is coupled to a second component, that connection may be through a direct connection, or through an indirect connection via other components, devices, and connections. Furthermore, those of ordinary skill in the art will appreciate that when describing a first element with respect to a second element as disposed thereon, it is understood that disposing may be either directly disposing the first element on the second element or indirectly disposing the first element on the second element. For example, a first element may be directly disposed on a second element, such as by having the first element and the second element be in direct contact with each other, or a first element may be indirectly disposed on a second element, such as by having a third element, and/or additional elements, disposed between the first and second elements.

Embodiments herein describe one or more flow conditioners which may be helpful in stabilizing a flow profile of a fluid stream. The flow conditioners described herein may be useful in transitioning "unconditioned flow", i.e., disturbed flow, of a fluid to become "conditioned flow", i.e., stable, non-disturbed flow, which may useful for a number of reasons as discussed herein.

For their proper functioning, some devices need the flow profile of a fluid to be stable and uniform. Pumps and compressors are examples of such devices that benefit from having a stable and uniform flow profile of a fluid entering at their respective inlet points. Flow meters are also impacted by the flow profile of a fluid, and are in fact, dependent on a stable flow profile for their proper functioning. A flow meter as used herein may be any type of flow meter as known to those of ordinary skill in the art including, without limitation, ultrasonic, ph/Mv, electromagnetic, thermal, mass, positive displacement, velocity based, open channel, orifice, pitot tube, turbine, inference, and vortex flow meters. Inference flow meters are a type of flow meter which may infer flow by measuring a dynamic property of the flowing fluid stream. Interference metering infers volume based on a cross-sectional area of a meter. Many interference meters rely on a developed and stable flow profile (i.e., non-changing and symmetrical with respect to cross-sectional area). Commonly known inference flow meters include turbine meters that infer flow by monitoring impeller speed, orifice meters that infer flow by monitoring pressure differential, and Coriolis meters that infer flow by sensing the Coriolis force on vibrating tubes.

The accuracy of the measurements obtained by a flow meter may depend on good flow conditions (i.e., undisturbed flow with minimal irregularities) to accurately measure one or more properties of the fluid. For example, turbulent flow may provide a region of good flow conditions for obtaining measurements when using an inference meter in accordance with embodiments disclosed herein. Relevant flow conditions that may be of concern mainly refer to the flow velocity profile, irregularities in the profile, varying turbulence levels within the flow velocity or turbulence intensity profile, swirl, and any other fluid flow characteristics which will cause the flow meter to register flow different than that expected.

An overall design of the pipe and associated structural components may affect the flow profile of a fluid. The installation is known in the art as the on-site structural layout and arrangement of a pipe and associated structural components. Various joints, connectors, and other devices may be useful for implementing various pipe configurations and structural design, often within a limited amount of space. Such joints, connectors, and other devices may include without limitation elbows (both in plane and out of plane), valves, bends, tees, adaptors, and/or reducers, which may be respectively used on-site to change one or more dimensions, shape, direction, or orientation of a corresponding pipe. It is noted that the effects of such components, joints, and devices on a flow profile of a fluid passing through such elements is known in the art as installation effects. Installation effects may contribute to altering a fluid's flow profile and contribute to disturbed flow. One or more flow conditioners (e.g. 202 in FIGS. 1 and 2) may be used to condition disturbed flow, including after passing through pipe having one or more such joints or devices described above In an ideal setting, a fluid would be able to flow unobstructed through a pipe with a uniform diameter, and would have a sufficient amount of straight run to flow through. A "straight run" as understood in the art refers to a pipe that remains straight in a single direction such that the pipe does not change its direction or elevation. Further, a "diameter" of straight run pipe is known in the art as a length of pipe between the flow conditioner and the meter. Manufacturers of flow meters may provide a recommended number of diameters of straight run for proper functioning of a flow meter. In many industries, including without limitation, the oil and gas industry, a common problem often experienced is that the desired upstream or downstream space for straight-run of pipe is simply not available. This lack of upstream or downstream piping, i.e., straight run, does not allow sufficient transit time for flow profiles to be stable when reaching a flow meter. A benefit of a straight run is that it provides an obstruction-free, straight distance of pipe over which the flow profile of a disturbed fluid may naturally "settle" before reaching equipment that is sensitive to a flow profile of a fluid, such as flow meters, pumps, compressors, and/or any other equipment that is sensitive to the flow profile of a fluid. Straightening section 110 is illustrated in FIG. 1 and further described below.

If a flow conditioner is located ahead of a flow meter in a direction of fluid flow, that flow conditioner is said to be "upstream" of the flow conditioner. Conversely, if a flow conditioner is located after a flow meter in the direction of fluid flow, that flow conditioner is said to be "downstream" of a flow meter. Some flow meters, depending on their type and configuration, as well as the process parameters and composition of a relevant fluid, may require a minimum distance, i.e., diameter of straight run pipe in both an upstream and/or downstream direction. Accordingly, some flow meters may benefit from having a flow conditioner located some minimum or specific distance upstream of the flow meter.

Turning to FIG. 1, a diagram of a pipe and a flow conditioner according to embodiments of the present disclosure is provided. In one or more embodiments, FIG. 1 provides an example of a system using one or more components for a flow conditioner as described herein. FIG. 1 is shown for clarification purposes only. However, it will be apparent to one of ordinary skill in the art that the embodiments disclosed herein may be practiced without these specific details. Furthermore, well-known features have not been described in detail to avoid unnecessarily complicating the description.

FIG. 1 shows pipe 102 through which a fluid 118 may flow. Fluid 118 may be in any state or flow regimen, including laminar, transition, or turbulent flow regimen, which is further described below. Pipe 102 may include an elbow 103, which connects pipe 102 as it curves and changes orientation from a vertical to a horizontal direction. An elbow may be an example of a device that causes installation effects (as described herein). As fluid 118 flows through a top portion of pipe 102 through elbow 103, fluid 118 may exhibit characteristics of disturbed flow, shown as disturbed flow 104. Disturbed flow 104 may include numerous swirls and irregularities in its flow profile, which may ultimately hinder the ability for flow meter 108 to take accurate measurements.

A flow conditioner 201 is disposed in pipe 102 upstream of a flow meter 108. Flow conditioner 202 (further described below in FIG. 2) may be provided to assist in conditioning the disturbed fluid flow 104 before reaching flow meter 108. Flow conditioner 202 may beneficially provide a minimum pressure drop while conditioning disturbed flow 104. As fluid 118 flows through ring 204 in its disturbed state (104), fluid 118 may flow over an inner surface of ring 204 including steps 216 (as further described below and shown in FIG. 2). In accordance with one or more embodiments described herein, steps 216 may be designed to vary in terms of one or more dimensions and/or spacing between each other in order to provide shearing effects on the fluid so as to condition the flow. In other words, the steps may be dynamically changed to provide effective shearing of the fluid. The steps may vary in thickness, diameter, and depth depending upon a specific application. Fluid 118 may flow over each stepped element of steps 216 and then proceed to flow over surfaces of fin assembly 210.

A front face of fin assembly 210 is shown as being coupled to a rear face of ring 204. Further, fin assembly 210 may be coupled to one or more interior surfaces of pipe 102 (including those that are adjacent to the sides of fin assembly 210). For example, as shown in FIG. 1, a top outside edge of fin assembly 210 may be coupled to a top interior surface 120 of pipe 102.

After flowing over the steps 216, fluid 118 may subsequently flow over sides of first fin 212 and second fin 214, which form fin assembly 210. Fin assembly 210 causes at least a portion of the fluid to break contact with the interior surfaces of pipe 102, and force that portion of fluid 118 to interact with the surfaces of fin assembly 210.

Fluid 118 may subsequently flow past the end of fin assembly 210 and resume contact with the interior surfaces of pipe 102. Fluid 218 may flow over a distance 110 before reaching a threshold area 122 in pipe 102 where fluid 118 may be measured by flow meter 108.

Distance 110 may be a minimum diameter of straight run needed for fluid 118 to stabilize and exhibit conditioned flow conditions 106. Distance 110 may also be called a "straightening section", which may be the distance between flow conditioner 202 and flow meter 108 that allows the flow stream of fluid 118 to stabilize before reaching flow meter 108. It is noted that the pipe 102 is meant to be level between flow conditioner 202 and meter 108.

It is noted that conventional flow conditioners (e.g., particularly used with hydro-carbon metering) typically require a specific length of straightening section that is equal to ten times the diameter of the meter (e.g., for a 10 inch meter, a straightening section of 100 inches would be required). Further, conventional flow meters particularly suited for liquid hydro-carbon metering, performance with a flow conditioner has 0.15% linearity (deviation from expected output value). This linearity is defined over a 10:1 turndown (maximum flow rate to 10% of maximum flow rate) and an installed "10D" straightening section, which may be a straightening section with 10 pipe diameters (length of pipe) between flow conditioner 202 and flow meter 108. In one or more embodiments, flow conditioner 202 may be able to operate with only five pipe diameters provided between flow conditioner 202 and meter 108. In particular, this may be suitable when the flow meter 108 is an ultrasonic flow meter. An ultrasonic flow meter uses a stable non-changing profile. Developing a stable non-changing profile may be considered difficult when located in close proximity to elbows and/or other obstructions. Other inference metering technology is also profile-dependent, but not as sensitive as ultrasonic flow meters, because other technologies generally have a fluid drive rotor which possesses mass, whereas ultrasonic flow meters are based solely off of transit time measurements. Those of ordinary skill will appreciate that other flow meters may be used with flow conditioner 202 and five diameters of pipe or less provided between flow conditioner 202 and flow meter 108. Thus, benefits of flow conditioner 202 may include that flow conditioner 202 may be disposed in pipe 102 with shorter distances between flow conditioner 202 and a flow meter, such as flow meter 108. This may translate to easier customer installation and ability to work with more pre-existing structures having pipe lengths that previously may have not been compatible with proper flow profile measurement.

As shown in FIG. 1, the disturbances previously exhibited in a flow profile of fluid 118, such as swirls and other irregularities that may negatively affect the accuracy of any measurements taken by flow meter 108, have been reduced or eliminated (shown as conditioned flow conditions 106) in response to the inclusion of flow conditioner 102 in a flow path of fluid 118.

Figure 10:
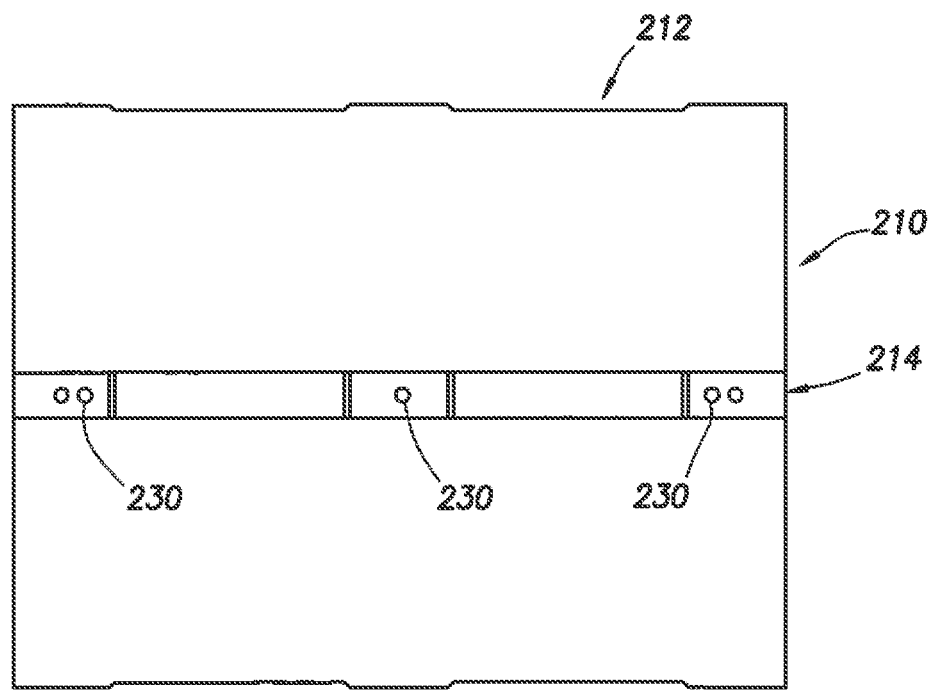
FIG. 10 shows a side view of the cross shaped fin assembly shown in FIG. 9.

Flow conditioner 102 may be located upstream of flow meter 108, as shown in FIG. 1. In one or more embodiments, an inlet of the flow meter 108 may coincide with threshold 122, which may be an area directly underneath or proximate to flow meter 108 where fluid crossing through the inlet of the flow meter 108 may be measured. For example, as shown in FIG. 10, the flow meter 108 may be an ultrasonic meter having an inlet 109 and one or more sensors 111 to determine flow rate. The fluid flowing through flow conditioner 102 may be provided to the inlet 109 of the flow meter 108 and across sensor(s) 111.

Typically, flow conditioners are targeted for a specific flow meter. For example, certain flow conditioners may conventionally only be used with ultrasonic flow meters or thermal flow meters, etc. In one or more embodiments, flow conditioner 202 may be used with multiple types of flow meters, including any of the flow meters already described above in the present disclosure. It is also noted that one or more flow conditioners, as described herein, including flow conditioner 202, may be used with one or more inference meters.

Further, flow conditioner 202 may be calibrated in conjunction with a flow meter 108 in actual field conditions in order to provide accurate measurements. The meter calibration factors are valid only if geometric and dynamic similarity exists between the metering and calibration conditions. Flow meters may have an original calibration state which is determined using reference conditions that are free of installation effects, include insufficient straight pipe, exceptional pipe roughness or smoothness, elbows, valves, tees and reducers, which may cause the flow conditions within a pipe to vary from the reference conditions. One or more embodiments of the flow conditioners described herein, including flow conditioner 202, may assist in matching reference conditions by helping to achieve more fully developed flow, i.e., a desired flow profile of a fluid, and may enable accurate measurement despite any such installation effects. Fully developed flow implies that the velocity profile and the momentum also do not change in the flow direction.

It has been found herein that a number of disturbances may be caused to occur in a fluid stream as it flows within a pipe. One such contributor to the creation and development of these disturbances is the fluid's interaction with the pipe wall, i.e., interior surfaces of pipe 102.

In one or more embodiments, the interactions between one or more components of a flow conditioner, such as ring 204, fin assembly 210, first fin 212, and second fin 214, may cause a shearing effect on fluid 218. Accordingly, fluid 218 temporarily loses contact with one or more interior surfaces of pipe 102, and instead flows over the various surfaces and edges of ring 204 and fin assembly 210 (when these components are both present). The interaction with the various surfaces and edges of any component of a flow conditioner 202 may assist in conditioning one or more disturbances in a flow profile of fluid 118.

One or more embodiments described herein may be useful in isolating and conditioning a flow stream with reduced pressure loss. Pressure loss is related to the energy requirements needed to cause a fluid to move through a pipeline. In one or more embodiments, energy requirements include consideration for the pump capacity needed to move fluid through a pipe. The various components of a flow conditioner according to embodiments described herein may provide reduced pressure less and thus require less pump capacity as compared to flow conditioners currently available in the art, which translates to saved energy costs to the consumer using flow conditioner 202.

Further, the step changes and spacing of the plurality of stepped elements 216 may assist in minimizing pressure loss in a pipe as the fluid travels the stepped elements.

It has been found herein that one or more components of a flow conditioner as described herein may be suitable for fluids of varying viscosities In the oil and gas industry, for example, a large range of fluids are transported via pipeline and piping systems with varying viscosities. These fluids, used for example purposes only, may range in terms of light to extremely heavy hydrocarbons.

The Reynolds number, Re, is defined as the ratio of momentum forces to viscous forces and is a dimensionless quantity that is used to help predict similar flow patterns in different fluid flow situations. In fluid dynamics, laminar flow occurs when a fluid flows down the pipe in parallel layers, with no disruption between the layers. The process of a laminar flow becoming turbulent is known as the transition range and turbulent flow is a flow regime characterized by chaotic property changes.

As understood in the art, there may be three main flow regimens, which include laminar flow, transition flow, and turbulent flow. Laminar flow may refer to fluids with a Reynolds number that may be approximately less than 2000, transition flow may refer to fluids with a Reynolds number that may be approximately between 2000 and 4000, and turbulent flow may include a Reynolds number that may be approximately greater than 4000. One or more embodiments of the flow conditioner as described herein may address different challenges of each condition and operates within each of the conditions differently.

The viscosity of a fluid may affect the Reynolds number associated with a fluid depending on the fluid's flow regiment. Higher viscosity fluids operate with a lower Reynolds number in the laminar, transition, and low end turbulent region. Heavier, high viscosity fluids may also have a more pronounced interaction with the contacted pipe wall. Fluids having higher viscosity possess the ability to prevent motion between molecules due to the higher cohesion and interaction between the molecules. Fluids with a higher viscosity also tend to have their profile 'deform' slower than fluids with a lower viscosity. This interaction in high viscous fluids may actually help, in and of itself, to remove/reduce swirl in fluids.

The molecular interaction with a flow conditioner, such as flow conditioner 202, as described in one or more embodiments herein, may provide a higher shear force which 'shears' away swirl that has been induced into the flow profile. Flow conditioner 202, as described in one or more embodiments herein, while acting in the laminar flow profile (e.g., Re<2000) for heavier, highly vicious fluids may assist in removing any of the remaining swirl. The cross-shaped fin assembly described herein, e.g., fin assembly 210, may also be a primary component for reducing swirl for fluids with a laminar flow profile for heavier, highly viscous fluids. Further, the steps of a ring for a flow conditioner as described herein may also help 'shear' the fluid from interacting with the pipe wall. This shearing effect may allow for the profile to appear more 'turbulent', providing a benefit for inference flow meters.

The next flow regime that will be discussed is the turbulent region (e.g., 2000<Re<4000). The turbulent region is typically associated with lighter (lower viscosity) fluids and/or higher flow rates. These fluids are less affected by shear stress as the cohesion/interaction between molecules is much smaller. This property prevents the fluid from being somewhat conditioned by the interaction with the pipe wall. Since the shear forces between molecules are smaller, there are less resistive forces opposing swirl. Thus, the 'swirling' profile can transfer further down a pipe for lighter fluids. In order for the swirl to be reduced and/or eliminated, the fluid may be sheared by an external/auxiliary component. In other words, a lighter product does not experience a large shearing force from the interaction with the pipe wall. Therefore, the 'swirling' profile is not removed from the fluid and transfers further down the pipe. Thus, a light product requires a much longer straight section (or better conditioning) for the fluid to become 'free' of swirl. The swirl is reduced or removed, so that the flow profile and the meter will not be influenced or affected by the swirl.

In one or more embodiments of the flow conditioner as described herein, when a lighter fluid flows through the flow conditioner, in turbulent flow, the lighter fluid may be sheared by one or more steps in a ring and/or by one or more sharp edges of the cross-shaped fin assembly 210. The interaction between different components of the flow conditioner, as described in one or more embodiments described herein, and the fluid may decrease the amount of swirl present in lighter fluids. Once the fluid particles pass through the flow conditioner, a majority of swirl has been removed and the fluid is allowed to recover again with the pipe wall, creating a more stable turbulent profile.

The transition region (e.g. Re>4000) is considered to be a combination of both laminar and turbulent flow. The flow may be said to 'switch' back and forth from laminar and turbulent. It is also assumed that the fluid will stay in its current state longer depending on which direction the flow is entering the transition region, i.e., the fluid will remain laminar longer if approaching the transition region from the laminar region and vice versa for turbulent to transition. By having a flow conditioner, such as flow conditioner 202 described in one or more embodiments herein, located in the transition region, flow conditioner 202 may help force the transition profile into a more fully developed turbulent profile. This may be achieved by introducing more shear forces via one or more interactions with one or more components of the flow conditioner. The presence of a flow conditioner, including any of the components of a flow conditioner described above, may assist a fluid in the transition region to move towards a more stable, turbulent profile, which may be useful in a number of flow metering technologies, and particularly in inference metering technologies. Having a stable profile provides for transit time measurements which are stable (or stable rotational velocities). This is useful when using inference meters in which metering 'infers' volume based off of flow rate (rotational speed for turbines) and the cross-sectional area of the measurement bore.

Figure 2:
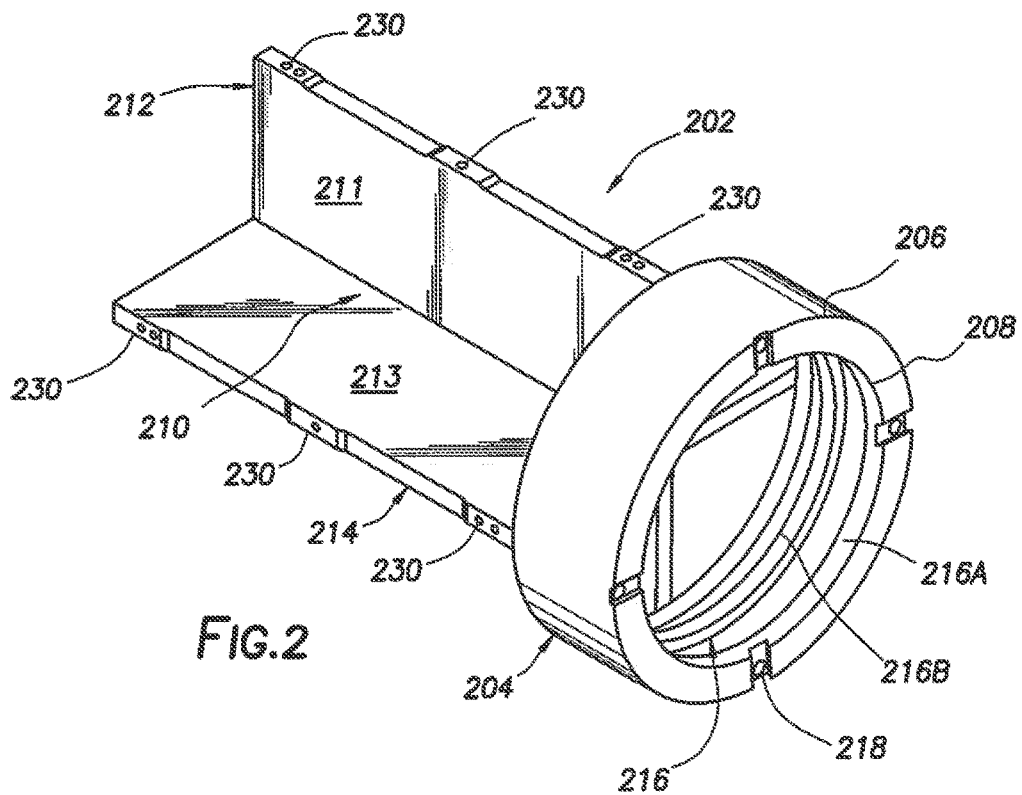
FIG. 2 shows a perspective view of a flow conditioner according to embodiments of the present disclosure.

Turning to FIG. 2, FIG. 2 illustrates a perspective view of the flow conditioner 202 according to embodiments described herein. In one or more embodiments, flow conditioner 202 includes ring 204 and fin assembly 210. In one or more embodiments, flow conditioner 202 is disposed within a conduit. In one or more embodiments, a conduit may be interchangeably referred to and described herein as a pipe (e.g., 102 in FIG. 1) or pipeline. Piping system may also be used herein to describe a system of one or more pipes and other components configured to operate together.

Ring 204 includes an outer surface 206 and an inner surface 208. In one or more embodiments, ring 204 is a cylinder. In other embodiments, ring 204 may have an oblong shape, a square shape, a rectangular shape, a semicircular shape, triangular shape, pentagonal shape, or any polynomial shape. As shown in FIG. 2, in one embodiment, ring 204 has a hollow center defined by a circumference of inner surface 208.

In accordance with one or more embodiments disclosed herein, ring 204 includes an inner profile that includes a plurality of steps 216 (e.g., a set of stepped elements). Accordingly, a step profile is provided with steps disposed generally one after another and along the inner circumference of the inner surface 208 of ring 204. In one or more embodiments, steps 216 may be one or more thread forms on the inner surface 208. Further, steps 216 may be one or more protrusions formed along an inner circumference of the ring. In addition to the above, in some embodiments, steps 216 may be disposed over an entirety of the inner surface 208 of ring 204. In other embodiments, steps 216 may be provided solely on a portion of the ring 204, for example, at a lower half of an inner surface 208 of ring 208, a middle portion, or an upper half of the inner surface 208 of ring 204.

As shown in FIG. 2, the plurality of steps 216 may be formed on the inner surface 208 of the ring 204. The plurality of steps 216 extend along an inner circumference of ring 204. As shown in FIG. 2, the plurality of steps 216 have a circular shape mirroring the circular/cylindrical shape of ring 204. However, those of ordinary skill in the art will appreciate that in other embodiments the plurality of steps 216 may have a non-circular shape, such as without limitation, an oblong shape, a square shape, a rectangular shape, a semicircular shape, triangular shape, pentagonal shape, or any polynomial shape, as understood by those of ordinary skill. In alternative embodiments, ring 204 may include only a single stepped element disposed internally within ring 204.

Each of the plurality of steps 216 may vary with respect to one or more other steps of the plurality of steps 216. For example, the steps may vary in height, diameter, overall dimensions, and/or spacing between each stepped element (as shown in FIGS. 7-8). In one or more embodiments, variations in height, diameter, overall dimensions, and/or spacing between the plurality of steps 216 may be determined by one or more equations developed to minimize the pressure drop that may occur as fluid flows through the hollow center of ring 204. In other words, a computation fluid dynamics package can be used to maintain the same ratio regarding diameter, height, spacing and depth regardless of the size of conditioner. The locations and size of each initial feature may be determined using a computation fluid dynamics software package. Dimensions and/or ratios may be adjusted until a desired output is achieved.

As shown in FIG. 2, step 216A has a different set of dimensions as compared to step 216B. For example, step 216A may have a larger diameter than ring step 216B. Further, step 216A may have a different height than step 216B, which is shown in FIG. 2. Accordingly, it is within the scope of the present disclosure that in one or more embodiments, each step of the plurality of steps 216 may include one or more variations with respect to each other. Those of ordinary skill in the art will appreciate that it is within the scope of the present disclosure for the plurality of steps 216 to have a same/uniform height, diameter, overall dimensions, and/or spacing with respect to one another. A scaled ring dimension may be determined, as shown at Equation (1) below, and the ratio, β, of the outer diameter of a step or space to the outer diameter of the ring may be determined, as shown at Equation (2). Table 1 below shows example Beta calculations for a 12 inch circular shear ring according to embodiments disclosed herein.

$$\text{Scaled Ring Dimension} = \text{Dimension on 12'' Model} \cdot \frac{\text{Scaled } Sch.\ 40\ \text{Pipe Inner Diameter}}{12''\ Sch.\ 40\ \text{Pipe Inner Diameter}} \quad (1)$$

$$\beta = \frac{\text{Diameter of Step/Space}}{\text{Outer Diameter of Ring}} \quad (2)$$

TABLE 1

Beta Calculation Example for 12" Circular Shear Ring

| Item Number | Outer Diameter | Inner Diameter | β |
|---|---|---|---|
| 602 | 11.818" | 4.784" | 0.405 |
| 604 | 11.818" | 5.324" | 0.450 |

The ratio, α, of the length of the space to the axial length of the shear ring may be determined, as shown at Equation (3). Table 2 below shows example Alpha calculations for a 12 inch circular shear ring according to embodiments disclosed herein.

$$\alpha = \frac{\text{Length of Space}}{\text{Length of Shear Ring Axially}} \quad (3)$$

TABLE 2

Alpha Calculation Example for 12" Circular Shear Ring

| Item Number | Length of Shear Ring | Length of Space | A |
|---|---|---|---|
| 702 | 4.000" | 1.375" | 0.344 |
| 704 | 4.000" | 0.750" | 0.188 |

In one or more embodiments, the plurality of steps 216 may be axially aligned and share a common axial centerline. In other embodiments, the plurality of steps 216 may not be axially aligned.

In one or more embodiments, a front side of ring 204 may include one or more fastener holes 218. FIG. 2 shows four such fastener holes 218 positioned substantially evenly around the front side of ring 204. In one or more embodiments, fasteners disposed in fastener holes 218 may be used to attach ring 204 to fin assembly 210. In one or more embodiments, ring 204 may be formed as a separate member from fin assembly 210. Nevertheless, those of ordinary skill will appreciate that in other embodiments, ring 204 and fin assembly 210 may be formed as a single structure through various manufacturing techniques known in the art. Accordingly, in such embodiments, a single structure may be forged of the same or different materials to achieve a desired shape of a flow conditioner that may have, in one or more embodiments, the same shape and appearance of flow conditioner 202 as shown in FIG. 2 and described herein.

In one or more embodiments, fastener holes 218 may extend through a body of ring 204 from a front face of ring 204 to a rear face of ring 204. To couple the fin assembly 210 to the ring 204, the rear face of ring 204 may be positioned opposite a front face of fin assembly 210 and one or more fasteners may be disposed in fastener holes 218 and into one or more fins of the fin assembly 210.

Any fasteners may be used by those of ordinary skill in the art, including bolts, clips, clamps, screws, nails, or any other fastener known in the art (by locating such fasteners within fastener holes 218). While the present disclosure may describe and the figures may show fastener holes to be used with one or more fasteners disposed therein, it is well within the scope of the present disclosure for other techniques for securing any component of a flow conditioner provided herein or even any surface of a pipe to a flow conditioner. Other means of securing components or surfaces to another may include, without limitation, welding, soldering, or the use of adhesives or magnets. Further, flow conditioner 202 may be flange mounted to the inner wall of a pipe.

Those of ordinary skill in the art will appreciate that in one or more embodiments, flow conditioner 202 may be designed to fit the size and shape of any sized pipe. It is noted that the environment where a flow conditioner, such as flow conditioner 202, may be used may determine one or more design and structural considerations of flow conditioner 202. The environment where a flow conditioner 202 may be located may include consideration for the type of materials used in a pipe configuration, as well as the type and composition of fluids flowing through the pipe where flow conditioner 202 may be located.

In one or more embodiments, fin assembly 210 may include one or more fins coupled together. As shown in FIG. 2 fin assembly 210 includes a first fin 212 and a second fin 214 coupled together. First fin 212 and second fin 214 may act as flow straightening fins in one or more embodiments. In other words, the first and second fins 212, 214 reduce or remove swirling of the fluid flowing over the surfaces of the fins 212, 214. In one or more embodiments, first fin 212 and second fin 214 also be interchangeably described as a plate and/or plate member. In one or more embodiments, first fin surface 211 of first fin 212 is perpendicular to second fin surface 213 of second fin 214. In one or more embodiments, the fins 212, 214 may be two plates joined together in a generally cross-shape. In other embodiments, the fin assembly 210 may include four individual plates coupled together to form a substantially cross-shape.

As shown in FIG. 2, first fin 212 and second fin 214 are coupled to form a shape of a cross. In other embodiments, first fin 212 and second fin 214 may be coupled to form any shape, and first fin 212 may be disposed at other angles than at a right angle with respect to second fin 214. Accordingly, in one or more embodiments, the fins may not be oriented perpendicular to one another, but rather intersect at an angle less than or greater than 90 degrees, i.e., such that the angle between first fin surface 211 and second fin surface 213 is acute or obtuse.

Continuing with FIG. 2, a set of fastener holes 230 may be provided along one or more edges of first fin 212 and second fin 214. A set of fastener holes, i.e., fastener holes 230, are disposed along a first outside edge of first fin 212. Fastener holes 230 may also be disposed along a first outside edge of second fin 214. In one or more embodiments, a set of fastener holes may also be disposed following the same pattern along a second outside edge (not shown) opposite the first outside edge of first fin 212 and along a second outside edge (not shown) opposite the first outside edge of second fin 214. These fastener holes may be used to join fin assembly 210 to an inner surface of a pipe (e.g. inner surface 120 of pipe 102 in FIG. 1) using one or more fasteners as known in the art.

Further, those of ordinary skill in the art will appreciate that flow conditioner 202 may be comprised of independent elements that are coupled together as shown in FIG. 2. In one or more embodiments flow conditioner 202 may solely include ring 204, without fin assembly 210. In additional embodiments, flow conditioner 202 may solely include the fin assembly 210. In other embodiments, flow conditioner 202 may solely include the ring 204 coupled to a single fin (e.g. either fin 212 or fin 214). It is noted that in some embodiments, a length of first fin 212 or second fin 214 may be varied as desired. In one or more embodiments, ring 204 may include a ring without the stepped elements shown in FIG. 1. Further, in one or more embodiments, there may be greater than two fins included as a fin assembly 210. For example, in one or more embodiments three fins may be intersected. In other embodiments, five fins may intersect to form a star pattern. One of ordinary skill in the art may appreciate that more or less fins may be included in one or more embodiments.

The material of construction used to manufacture ring 204 and/or fin assembly 210 (including each individual fin, i.e., fins 212, 214) may be any material as understood by a person of ordinary skill in the art. Further, any type of manufacturing process may be used, including but not limited to, forging and casting.

In one or more embodiments, ring 204 is designed to allow for the fluid that is in contact with the wall to be "sheared" from the wall. This shearing effect allows for the fluid to break the interaction with the wall. Once the fluid loses contact (even if only temporarily) with the pipe wall (i.e. inner surface of pipe such as inner surface 120 in FIG. 1) the fluid is then allowed to recover, become in contact with the wall again, allowing the fluid to create a stable flow profile. The ring (204) shears the fluid and 'breaks' the interaction with the wall. This removes any irregularities being created from the interaction with the pipe wall. Once the fluid is sheared, it is allowed to re-interact with the pipe wall after passing through the shearing ring. The decrease in the diameter also allows for a localized acceleration of the fluid to help remove further abnormalities in the flow profile. The ring may operate solely by itself, but may be used in conjunction with the fin assembly (210) to enhance performance.

In one or more embodiments, the fin assembly 210, which in one embodiment is cross-shaped and includes two fins, operates in a manner to remove any 'swirl' that has been created in the flow due to specific upstream piping configurations. In one or more embodiments, the length of the fin assembly is determined as a ratio which is specific to the inner diameter of the pipe in which the conditioning element is operating within. The fin assembly (210) 'destroys' the swirl and or cross flow which has developed in the flow. It retards the swirl. This, in conjunction with the shearing from the pipe wall, reduces the swirl which was present and allows the fluid to re-interact with the pipe wall and develop a more desirable profile for inference metering. Again, the fins may operate solely by themselves, but may be used in conjunction with the ring (204) to enhance performance.

Figure 3:
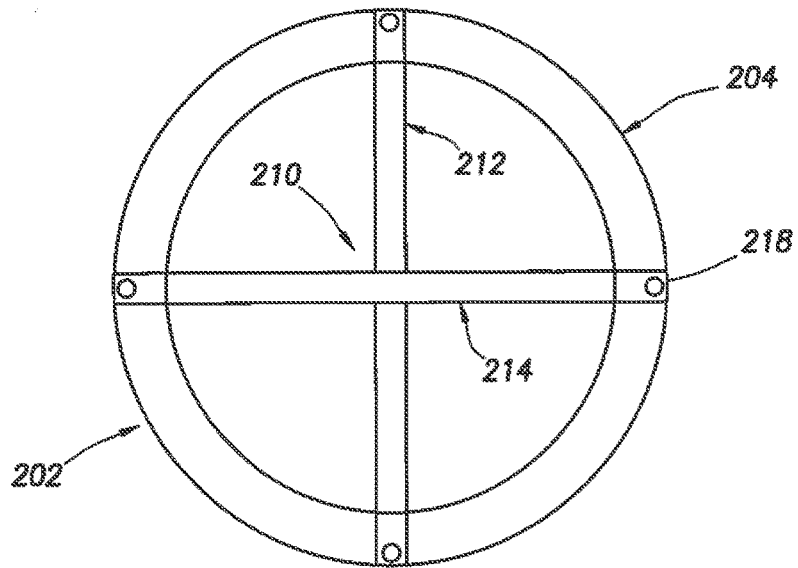
FIG. 3 shows a front end view of a flow conditioner according to embodiments of the present disclosure.

FIGS. 3-11 provide more detailed views of various components of flow conditioner 202 which is shown in FIG. 2. Turning to FIG. 3, a front end view of the fin assembly 210 of the flow conditioner 202 is provided according to embodiments of the present disclosure. The plurality of steps 216 of ring 204, as shown in FIG. 2, are not visible in FIG. 3, but may still be included on the inner surface of ring 204. Fastener holes 218 are shown in FIG. 3 as being equidistant at opposite points on a front face of ring 204. In one or more embodiments, the front face of fin assembly 210 may be coupled to a rear face of ring 204 by being fastened with a set of fasteners (not shown) disposed in one or more of fastener holes 218 and extending into fins 212, 214 of fin assembly 210 (see e.g., FIG. 7).

Figure 4:
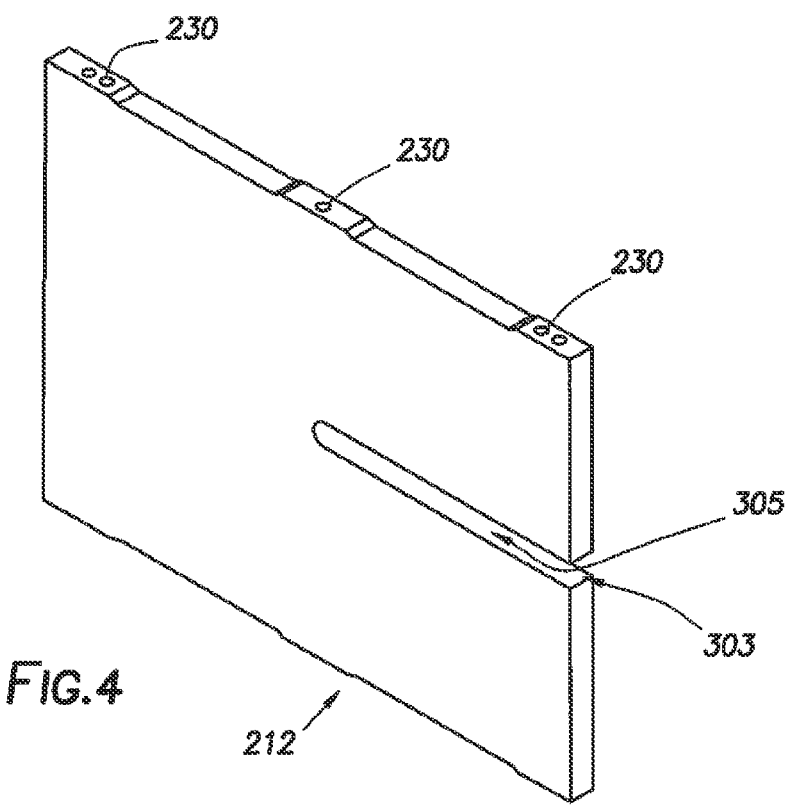
FIG. 4 shows a perspective view of a fin according to embodiments of the present disclosure.

FIG. 4 shows a perspective view of fin 212 (shown in FIG. 2) that may be used to condition a flow profile of a fluid according to one or more embodiments described herein. In one embodiment, fin 212 illustrates a design of a fin that may be oriented for conditioning fluid 118 (FIG. 1) in a pipe. It is noted that the description provided herein for fin 212 is also applicable to fin 214. In other words, fin 212 as shown in FIG. 4 and FIG. 5 operates and may be designed as fin 214 in one or more embodiments.

In one embodiment, fin 212 is a plate member useful as one of a set of components of a fin assembly, such as fin assembly 210. In alternative embodiments, fin 212 may be used as an individual fin, and may be disposed within a pipe in either a vertical or horizontal position, as a flow conditioner by itself or in conjunction with a ring, such as ring 204.

Figure 5:
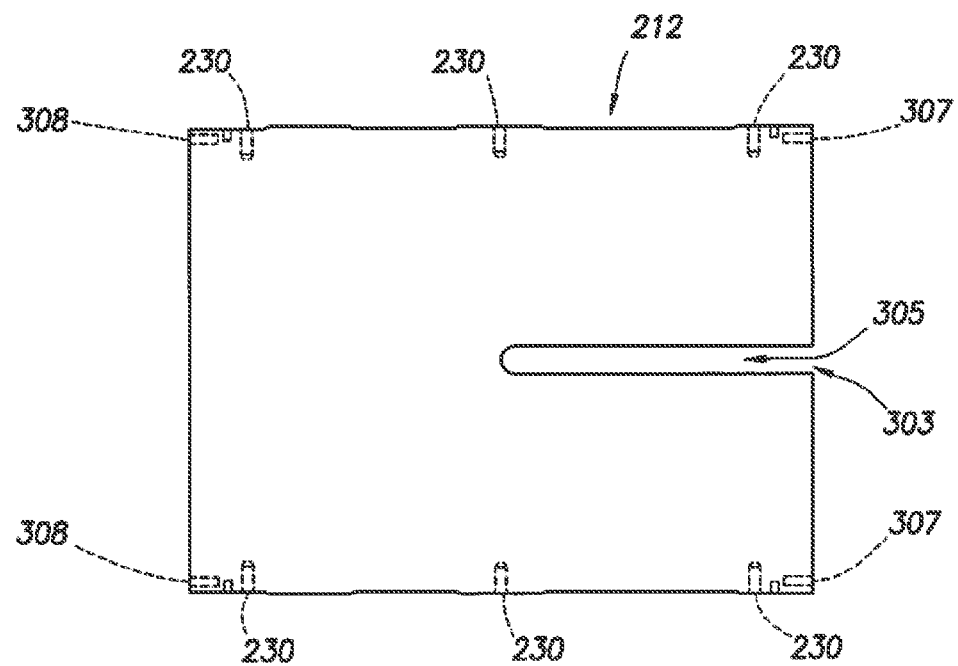
FIG. 5 shows a cross sectional side view of a fin according to embodiments of the present disclosure.

Fin 212 includes a groove, shown as groove 303 in FIG. 4 and FIG. 5. Groove 303 may include an opening 305 that allows another member, such as another fin (e.g., fin 214 in FIG. 2) to be disposed within opening 305. When another fin, such as fin 214 (FIG. 2), is disposed within opening 305 a fin assembly may be formed, in a number of shapes and forms. In one embodiment, a shape of a cross may be achieved if a second fin is disposed within opening 305 of groove 303 and oriented perpendicular to the fin 212.

FIG. 5 shows a side view of a fin, such as fin 212, in accordance with one or more embodiments described herein. FIG. 5 shows a plurality of fastener holes (230) dispersed along at the top and bottom of fin 212. FIG. 5 also shows fastener holes 307, located at a front side of fin 212 and fastener holes 308 located at a rear side of fin 212 The arrangement of plurality of fastener holes 307 and 308 and plurality of fastener holes 230 may be useful in allowing a fin to be interchangeably used in either a vertical or horizontal direction as either a component of a fin assembly or independently on its own. In one or more embodiments, fasteners extending through fastener holes 218 (FIG. 2) may couple with the fastener holes 308 or 307 in order to couple ring 204 to fin assembly 210. Those of ordinary skill in the art will appreciate that more or less holes for fastening a fin to a surface of a pipe or to another component is within the scope of the present disclosure for one or more of the embodiments described herein. Welding or adhesives or other techniques for connecting fin 212 and fin 214 to one another may be used as known in the art.

FIG. 6 provides a perspective view of a ring for use in stabilizing a flow profile of a fluid according to embodiments described herein. In one or more embodiments, ring 204 may be used as a flow conditioner on an individual basis or may be combined with other components to form a flow conditioner. Accordingly, ring 204 may be coupled to fin assembly to form a flow conditioner, such as flow conditioner 202 shown in FIG. 2.

FIG. 7 shows an inner profile of ring 204. As shown, the inner surface of the ring 204 has an inner profile that is non-continuous, non-smooth, or perturbed. Specifically, the inner surface of ring 204 has a step profile that includes a plurality of steps 216. As described above, one or more steps may vary in one or more dimensions and/or spacing as compared to another step of the plurality of steps 216. For example, FIG. 7 shows a cross-sectional view of ring 204, taken along section line 6-6 of ring 204 in FIG. 6. As shown in FIG. 7, a first diameter 602 of step 216A is different from a second diameter 604 of step 216B as located within ring 204. It is noted that in some embodiments having steps 216, two or more steps may have the same diameter while other steps have a different diameter. The spacing and diameters may be determined utilizing a computational fluid dynamics software modeling tool, such as CFD Module, commercially available from COMSOL (Burlington, Mass.). The locations and size of the features were chosen in order to minimize the pressure drop but also develop a stable profile. The size of the features may be changed to achieve a desired stable flow. By creating several small 'steps' the pressure drop was minimized when comparing against one single large step or other conditioning technologies. By creating multiple 'smaller' pressure drops, the localized pressure drop is not all observed at once and helps prevent any cavitation occurring in the fluid. This may help to minimize the pressure drop across the conditioner and to prevent damage in equipment.

Further, FIG. 8 is provided to clarify one or more differences that may exist between the plurality of steps 216. FIG. 8 is an exaggerated interior view of ring 204, taken along section line 7-7 of ring 204 as shown in FIG. 7. FIG. 8 shows that spacing 702 between step 216A and step 216B is different than spacing 704, which extends between step 216B and another adjacent step. Accordingly, one of ordinary skill in the art will understand that, in one or more embodiments, the spacing may vary between each step and the dimensions may vary for each step. Further, it is noted that in one or more embodiments, the plurality of steps 216 may have the same dimensions for each step and spacing between each step. Ring 204, may be customized with dimensions and spacing for a plurality of steps 216 to best suit the fluid composition and installation associated with a flow conditioner.

Figure 9:
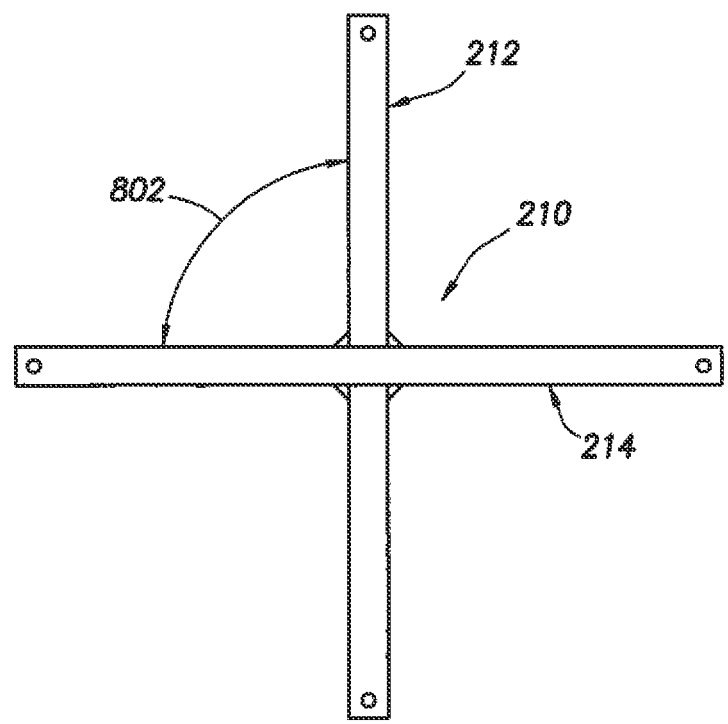
FIG. 9 shows a front end view of a cross-shaped fin assembly according to embodiments of the present disclosure

FIGS. 9 and 10 provide further detail of the fin assembly 210 according to embodiments described herein. FIG. 9 is a front end view of fin assembly 210. In one or more embodiments, fin assembly 210 may include fin 212 and fin 214, which may be disposed at a right angle 802 with respect to each other. As described above, in other embodiments, fin assembly 210 may be disposed at any angle less than or greater than 90 degrees to one another. FIG. 10 is a side view of the fin assembly 210 shown in FIG. 2 and FIG. 9. In this side view, fastener holes 230 are visible on fin 214. In one or more embodiments, fasteners may be inserted into these fastener holes and used to secure in place fin 214 to one or more surfaces of pipe 102. Alternative methods of attaching or securing either of the fins, 212, 214 of fin assembly 210, to one or more interior surfaces of pipe 102 may be used as understood by those of ordinary skill in the art.

Figure 11:
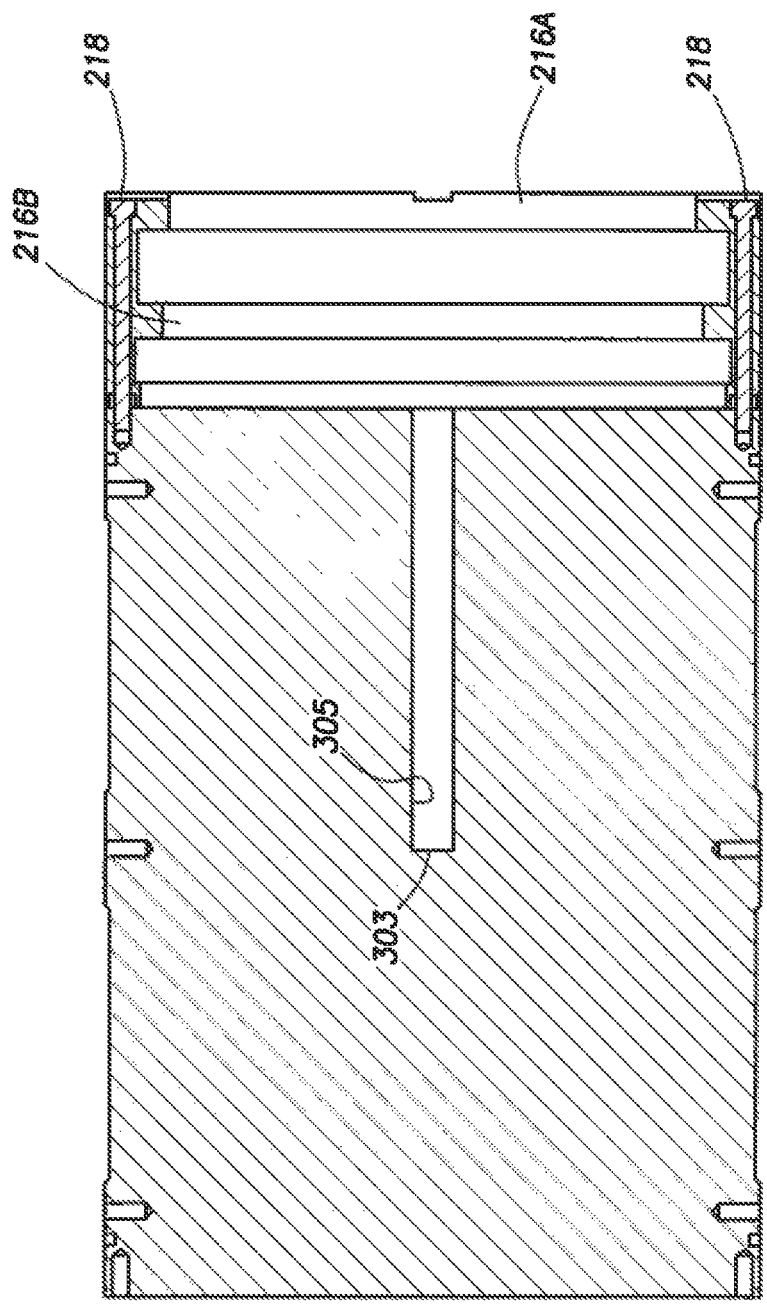
FIG. 11 shows a cross-sectional view of a flow conditioner according to embodiments of the present disclosure.
Figure 12:
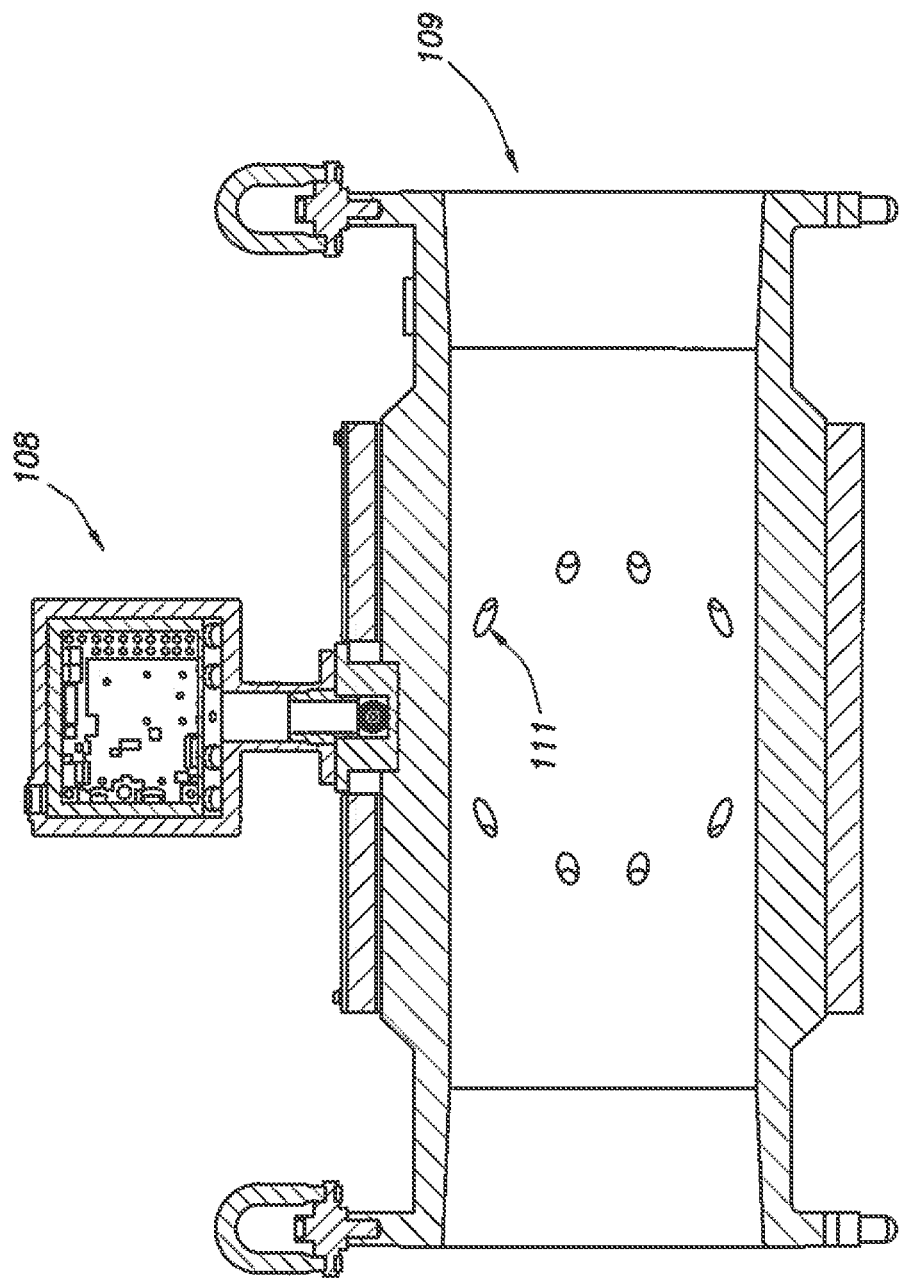
FIG. 12 shows a cross-sectional view of an ultrasonic meter in accordance with embodiments of the present disclosure.

FIG. 11 is a cross-sectional view of flow conditioner 202 (as shown in FIG. 2) according to embodiments of the present disclosure. In accordance with flow conditioner 202, as shown in FIG. 2 and described therein, ring 204 is coupled to a fin assembly 210. Fastener holes (218, FIG. 2) are provided as an example of where holes may be included and where fasteners may be inserted in one or more embodiments for coupling ring 204 to fin assembly 210. According to one method for securing ring 204 to fin assembly 210, fasteners may be inserted into holes 218 and extend into a body of ring 204 (FIG. 2) from a front side of ring 204 to a rear side of ring 204 so as to couple with a front side of fin assembly 210.

As noted above, those of ordinary skill in the art will appreciate that flow conditioner 202 may be comprised of independent components described above rather than ring 204 and fin assembly 210 being coupled together (as shown in FIG. 2). Accordingly, flow conditioner 202 may be solely composed of ring 204 or fin assembly 210. In some embodiments, flow conditioner 202 may be a single fin, for example, either fin 212, 214. Fin 212, 214 when used as a single fin may be oriented in either a vertical or horizontal direction and secured to one or more interior surfaces (e.g. 120) of pipe 102.

In accordance with one or more embodiments of the present disclosure, a method for conditioning fluid using flow conditioner 202 may include coupling flow conditioner 202 to an interior surface of a conduit (e.g. pipe 102), flowing the fluid through the conduit, whereby the flowing fluid contacts a surface of flow conditioner 202. In one or more embodiments, flow conditioner 202 comprises a ring having an outer surface, an inner surface, and at least one stepped element disposed on an inner surface of the ring. In one or more embodiments, contacting the flow conditioner may reduce one or more disturbances existing in a flow profile of the fluid. Further, a flow meter may be positioned downstream of a flow conditioner for measuring the flow profile of the fluid with the flow meter.

It has been found herein that one or more embodiments of the flow conditioners described herein may be useful in reducing the straight run pipe that is typically needed between a flow meter and a flow conditioner. One or more embodiments for a flow conditioner as described herein may beneficially provide for a smaller footprint for the customer installation because of the reduced amount of straight run pipe that needs to be made available between a flow conditioner and a flow meter. Furthermore, the flow conditioners provided in one or more embodiments herein may accommodate the varying viscosities and flow regiments associated with a wide variety of fluids that may pass through one or more pipes.

While the disclosure has been presented with respect to a limited number of embodiments, those skilled in the art, having benefit of this disclosure, will appreciate that other embodiments may be devised which do not depart from the scope of the present disclosure. Accordingly, the scope of the disclosure should be limited only by the attached claims.

What is claimed is:

1. A flow conditioner for use in a conduit, the flow conditioner comprising:
    a ring comprising:
        an outer surface;
        an inner surface opposite the outer surface and defining a hollow center of the ring, the inner surface having a plurality of stepped elements extending toward the hollow center,
        wherein each stepped element is adjacent to another stepped element in an axial direction of the ring such that an inner profile of the ring is a step profile in the axial direction, and
        wherein each stepped element defines an inner diameter of the ring smaller than a diameter of the ring between stepped elements.

2. The flow conditioner of claim 1, further comprising a fin assembly coupled to the ring, the fin assembly comprising a first fin and a second fin, wherein the first fin and the second fin are coupled together.

3. The flow conditioner of claim 2, wherein the fin assembly is coupled to one or more interior surfaces of the conduit.

4. The flow conditioner of claim 2, wherein the fin assembly is generally cross-shaped.

5. The flow conditioner of claim 2, wherein an angle between a face of the first fin and an opposing face of the second fin is acute or obtuse.

6. The flow conditioner of claim 1, further comprising a single fin coupled to rear face or the ring.

7. The flow conditioner of claim 1, wherein the spacing between the one or more of the plurality of stepped elements is unequal.

8. The flow conditioner of claim 1, wherein two or more of the plurality of stepped elements share a common axial centerline.

9. A method for conditioning fluid using a flow conditioner, the method comprising:
    coupling a flow conditioner to an interior surface of a conduit;
    flowing fluid through the conduit;
    flowing the fluid through the flow conditioner and contacting a surface of the flow conditioner with the flowing fluid, wherein the flow conditioner comprises a ring having an outer surface, an inner surface opposite the outer surface and defining a hollow center of the ring, and at least one stepped element extending from the inner surface of the ring towards the hollow center of the ring that provides a change in dimension of the inner surface along a length of the ring in an axial direction such that an inner diameter of the ring is smallest at the least one stepped element, the contacting the flow conditioner reducing one or more disturbances existing in a flow profile of the fluid;
    positioning a flow meter downstream of the flow conditioner; and
    measuring the flow profile of the fluid with the flow meter.

10. The method of claim 9, wherein the one or more disturbances comprises irregularities in the flow profile that alter one or more measurements taken by the flow meter.

11. The method of claim 9, wherein the at least one stepped element is disposed along a circumference of the inner surface of the ring.

12. The method of claim 9, wherein the positioning the flow meter downstream of the flow conditioner comprises locating the flow meter five pipe diameters downstream of the flow conditioner.

13. The method of claim 9, further comprising at least two stepped elements, wherein dimensions of the least two stepped elements are different with respect to one another.

14. The method of claim 9, wherein the at least one stepped element is configured to minimize a pressure drop that occurs as fluid flows through the ring and over the at least one stepped element.

15. The method of claim 9, wherein the flow conditioner further comprises a fin assembly coupled to a rear face of the ring, wherein the fin assembly comprises a first fin and a second fin disposed in a cross-shape.

16. The method of claim 15, further comprising reducing swirls disturbing the flow profile of the fluid upon contacting a surface of the fin assembly.

17. The method of claim 9, wherein the flow conditioner comprises a single fin coupled to the ring.

18. A system for using a flow conditioner in a conduit, the system comprising:
    a conduit;
    a flow meter coupled to the conduit; and a flow conditioner disposed in the conduit upstream of a location of the flow meter, the flow conditioner comprising a ring having an outer surface, an inner surface opposite the outer surface and defining a hollow center of the ring, a stepped element formed on the inner surface of the ring, the stepped element comprising a protrusion formed along an entire inner circumference of the inner surface of the rings such that an inner diameter of the ring is smallest at the protrusion; and a fin assembly coupled to the ring.

19. The system of claim 18, wherein the fin assembly comprises a first fin and a second fin, wherein the first fin and the second fin are disposed in a cross-shape.

20. The system of claim 19, wherein the first fin includes a longitudinal groove for engaging with a longitudinal groove of the second fin for coupling the first fin to the second fin.

\* \* \* \* \*